United States Patent [19]
Krimermann et al.

[11] Patent Number: 5,864,145
[45] Date of Patent: Jan. 26, 1999

[54] OPTICAL TRACING SYSTEM FOR MEASURING ELEVATION OF A REFERENCE BODY ABOVE A REFERENCE SURFACE

[75] Inventors: Joseph Krimermann, Haifa; Igor Friedland, Holon, both of Israel

[73] Assignee: ELOP Electro-Optics Industries Ltd., Kenovot, Israel

[21] Appl. No.: 778,258

[22] Filed: Jan. 8, 1997

[30] Foreign Application Priority Data

Jan. 9, 1996 [IL] Israel ..................................... 116.717

[51] Int. Cl.⁶ .................................................. G01B 11/30
[52] U.S. Cl. ..................... 250/559.29; 250/202; 356/376
[58] Field of Search ......................... 250/559.29, 559.31, 250/202, 559.4; 318/577, 640; 356/375, 376, 360, 3.01, 3.03

[56] References Cited

U.S. PATENT DOCUMENTS

| | | | |
|---|---|---|---|
| 4,796,998 | 1/1989 | Soma et al. ............................ | 356/376 |
| 4,878,754 | 11/1989 | Homma et al. ........................ | 356/376 |
| 5,275,327 | 1/1994 | Watkins et al. ....................... | 228/102 |
| 5,486,926 | 1/1996 | Hausler ................................. | 356/376 |
| 5,686,994 | 11/1997 | Tokura ................................... | 356/376 |

FOREIGN PATENT DOCUMENTS

| | | |
|---|---|---|
| 4242189C1 | 3/1994 | Germany . |
| 2233182A | 1/1991 | United Kingdom . |

*Primary Examiner*—Stephone Allen
*Attorney, Agent, or Firm*—Pollock Vande Sande & Amernick

[57] ABSTRACT

The invention provides an optical tracing system for measuring elevation of a reference body above a reference surface, comprising a laser transmitter radiating a light beam in a downward direction; an optical unit for imaging the radiation reflected from said body and said surface on a detector; filtering means for separating light originating from said laser from background illumination, and signal processing means for identifying said reference body and for measuring the elevation thereof from said surface.

7 Claims, 5 Drawing Sheets

OPTICAL TRACING SYSTEM FOR MEASURING ELEVATION OF A REFERENCE BODY ABOVE A REFERENCE SURFACE

BACKGROUND OF THE INVENTION

The present invention relates to an optical tracing system for measuring elevation of a reference body above a reference surface. The system of the invention is especially useful when attached to the blade or another part of an earth-moving, paving or grading machine which is being driven at normal working speed. The system detects a reference body such as a string line, cable, rod, curb or surface, measures and memorizes data regarding the initial elevation of the reference body above the ground, and thereafter continuously measures and compares measured values with the memorized data.

Elevation measurements are commonly performed in road construction operations and an ultrasonic range finder is normally used for this purpose. However, such a device requires some care in order to ensure accurate measurements, as it is adversely affected by wind, air temperature and temperature gradients. In addition, ultrasonic waves are reflected not only from the measured body, but also from the background, such as the ground beneath the body, which results in faulty measurements.

Optical tracers, based on the triangulation measuring technique, have been proposed in the past, e.g., in U.S. Pat. Nos. 4,456,826; 4,774,403; 5,129,725; 5,015,868 and 4,911,551. The first of these patents discloses a device based on rotating multi-facet mirrors, which is expensive and not durable if utilized in an open-air environment. In the other patents, a CCD array serving as a detector and a laser utilized as a light source are described. Such components are hardly compatible with road construction conditions, which, in general, require the low laser power dictated by eye safety regulations. These conditions include a large range of operation temperatures, below −20° C. in winter and up to 55° C. in summer in direct sunshine, and an extremely wide range of outer illumination conditions, from cloudy and rainy weather to bright sunshine, and also require the ability to measure elevation above different reference bodies (string line, cable, rod, curb, ground or passageway) wherein the type of reference body has to be automatically identified, as well as limited size and power consumption of the device used.

SUMMARY OF THE INVENTION

The present invention utilizes the triangulation principle for optical tracing of a reference body, e.g., in grading, earth-moving and paving operations. More particularly, the system according to the present invention includes a laser transmitter which forms a downwardly directed diverging beam shaped as a thin plane. This beam intersects a reference body, e.g., a string or cable, an edge of a curb, an earth surface or the like, and the area of intersection is imaged upon a television CCD camera. Location of the point of intersection on the image is determined by the relative position of the CCD camera (and the whole system) and the reference body.

It is therefore a broad object of the present invention to provide a system for separating a useful part of a video signal, e.g., an image of an intersection point, from the rest of the signal related to background pattern.

Still another object of the present invention is to provide an image processing system which is applicable and useful in a large variety of environmental conditions, e.g., external illumination level, variable temperature, etc.

In accordance with the present invention, there is therefore provided an optical tracing system for measuring elevation of a reference body above a reference surface, comprising a laser transmitter radiating a light beam in a downward direction; an optical unit for imaging the radiation reflected from said body and said surface on a detector; filtering means for separating light originating from said laser from background illumination, and signal processing means for identifying said reference body and for measuring the elevation thereof from said surface.

The invention will now be described in connection with certain preferred embodiments, with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 7b illustrates a video signal of a second field at the same frame of FIG. 7a;

DESCRIPTION OF A PREFERRED EMBODIMENT

Figure 1:
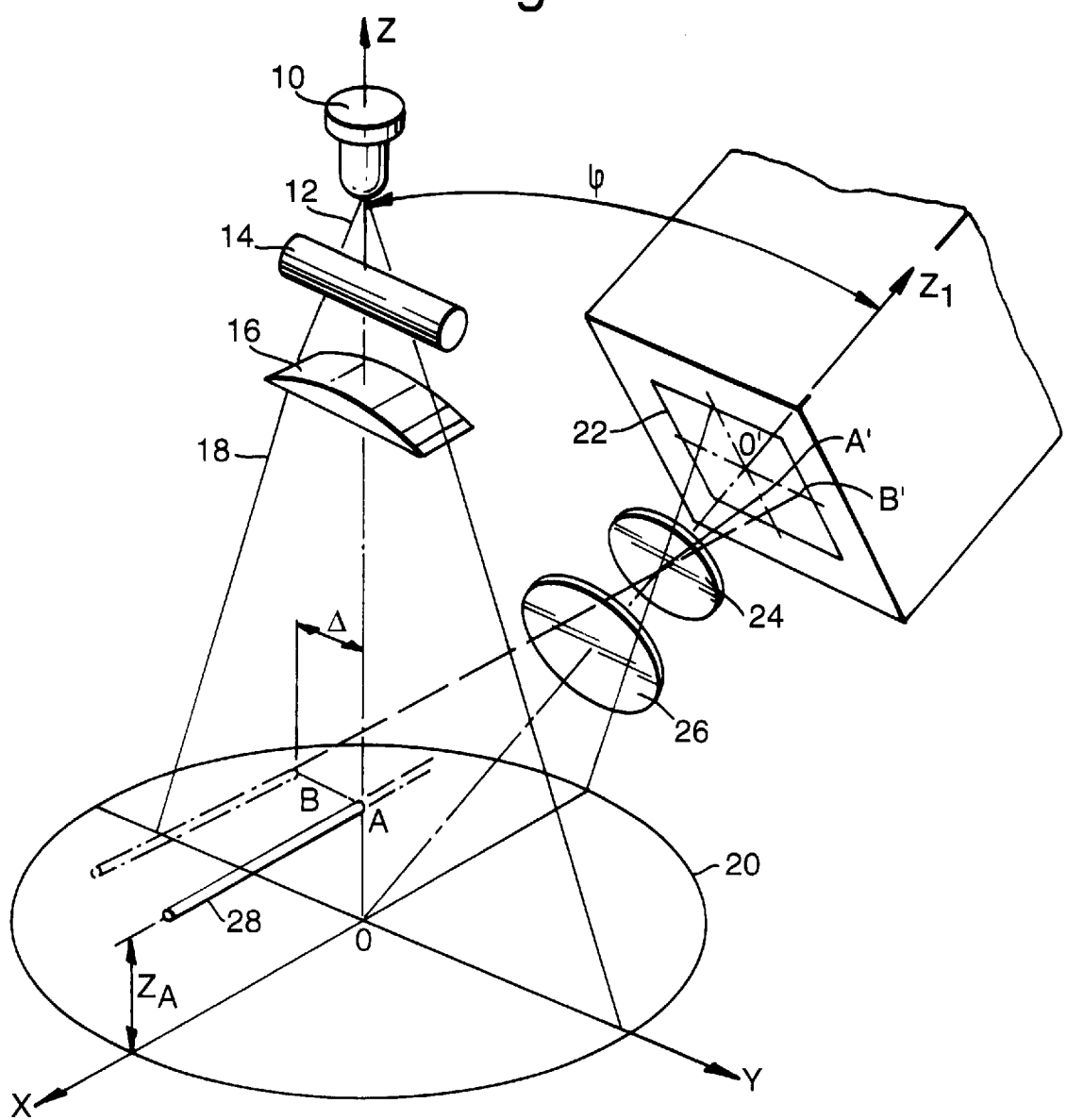
FIG. 1 is an exploded view of the optical tracer system according to the present invention, also illustrating the optical principles involved.

The principles of construction of the optical tracing system according to the present invention are illustrated in, and can be understood with reference to, FIG. 1. The coordinate system XYZ shown in the Figure is related to the laser 10, which emits a diverging beam 12. This beam is converted into a diverging thin sheet of light 18 by two lenses: a cylindrical lens 14 and a spherical lens 16. The sheet of light intersects a surface 20, e.g., the ground, under the assumption that the surface is horizontal along the axis OY.

At an angle $\phi$ the laser axis OZ, a receiver axis $OZ_I$ is positioned perpendicular to a matrix detector 22, which can be constituted by, e.g., a CCD camera. An optical lens 24 is positioned in such a way that the point O is imaged onto the center point O' at the detector 22. The field of view of the detector 22 is related to the shape of the light-illuminating surface 20.

An interference filter 26, having a maximum transmittance at a wavelength $\lambda$ identical to the working wavelength of the laser 10 and possessing a narrow bandwidth $\Delta\lambda$, provides the high contrast of the useful part of the image originated in the laser light, relative to the rest of the image originated in the environmental illumination such as direct or scattered sunlight.

When a body 28, e.g., a string line or cable, is positioned at the height $Z_A$ above the surface 20, the sheet of light 18 intersects the body 28 at the point A imaged onto the point A' on the detector 22. Given the angle $\phi$ and the scale factor $\rho$ between the plane of the detector 22 and the XOY plane, the height $Z_A$ can be calculated by measuring the distance O'A' on the face of the detector and exploiting the standard triangulation techniques. If the body 28 is horizontally displaced by a segment $\Delta$, this displacement can also be addressed by measuring the segment A'B' on the plane of the detector.

Figure 2:
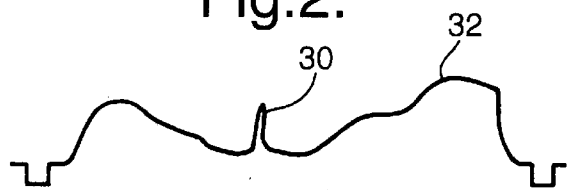
FIG. 2 is a typical video signal at the output of a CCD camera of the tracer system of FIG. 1.

Despite the fact that interference filter 26 facilitates improving the contrast of the laser light reflected from the reference body 28, it frequently happens that the laser light is almost undetectable at real working conditions. This usually results from the fact that even in a single field of view there are large variations of illumination intensity, due, for example, to shadowing of a part of the field of view. A typical video signal, comprising a single line of the composite video output of the detector, is shown in FIG. 2. As seen, portion 30 of the signal relating to the laser beam is lower than the other portion 32 of the signal, and consequently, the wrong result might be obtained.

Figure 3:
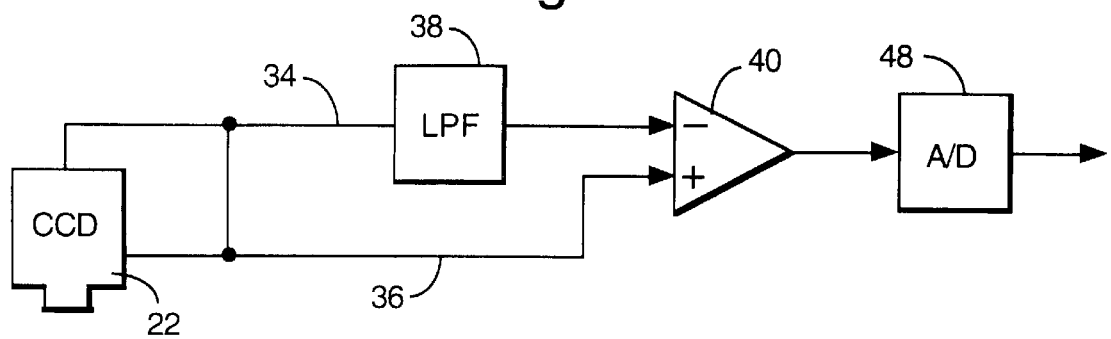
FIG. 3 is a block diagram of an electronic circuit used in the tracer system according to the present invention.
Figure 4:
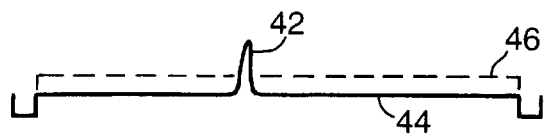
FIG. 4 illustrates a video signal at the input of an AID converter shown in the circuit of FIG. 3.

To solve this problem according to the present invention, the special electronic circuitry depicted in FIG. 3 is utilized. An output of the detector 22 is split into two branches 34, 36. In the first branch 34, the signal is passed through a Low Pass Filter (LPF) 38, while in the second branch 36 it remains unchanged. Due to the fact that the sheet of light 18 is thin, the laser originated peak portion 30 of the signal is very short (see FIG. 2). As a result, it is reduced significantly by the LPF 38, while the slow and smooth variations of the remaining portions 32 of the signal are not changed. Subtraction by an operational amplifier 40 of the signals respectively passing through the two branches 34, 36, yields a peak 42 (see FIG. 4) of a laser beam spot projecting above a substantially constant level 44 of the remaining portion of the signal, so that setting an appropriate threshold 46 allows for easy detection of the location of the laser beam spot. For further processing, the output signal from the operational amplifier 40 is passed through an A/D converter 48 to be digitized.

Figure 5:
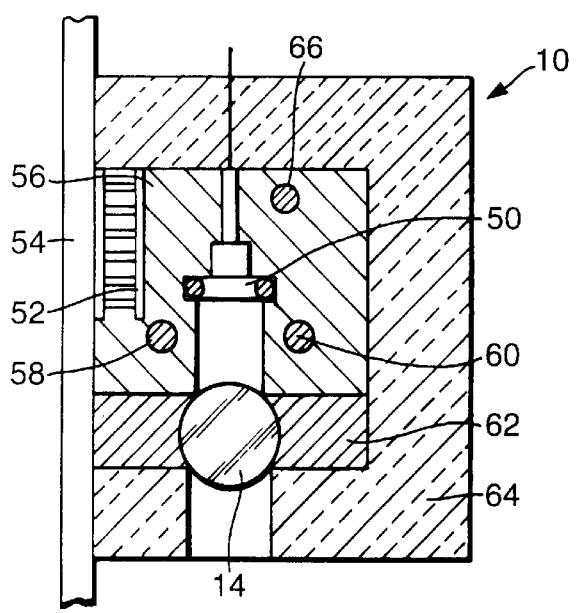
FIG. 5 is a cross-sectional view of the laser assembly with thermostabilizer of the tracer system.

Still further complications in the operation of the optical tracer system in open-air conditions reside in environmental temperature variations. Referring to FIG. 5, a laser assembly 10 is shown in cross-section. Because of compact size requirements, a small laser diode 50 is used as a light source. It is well known, however, that variations in temperature result in a drift of approximately 1 nm for each 5 degrees in the working wavelength of laser diode 50, and thus, a variation of 15° or more will cause the laser light to be outside the bandwidth $\Delta\lambda$ of the interference filter 26.

To solve this problem, the laser diode 50 is embodied in a chamber which is substantially thermally stabilized. The arrangement may include a Peltier thermoelectric cooler 52 having a heat sink 54 attached to a cooper-made body 56, where the laser diode 50 is located. Two resistors 58, 60 are affixed adjacent the diode 50 for heating same. Another member 62, in which the cylindrical lens 14 is installed, is attached to body 56 and the whole assembly is covered with thermal insulation 64. Temperature is constantly measured by a thermal resistor 66.

Figure 6:
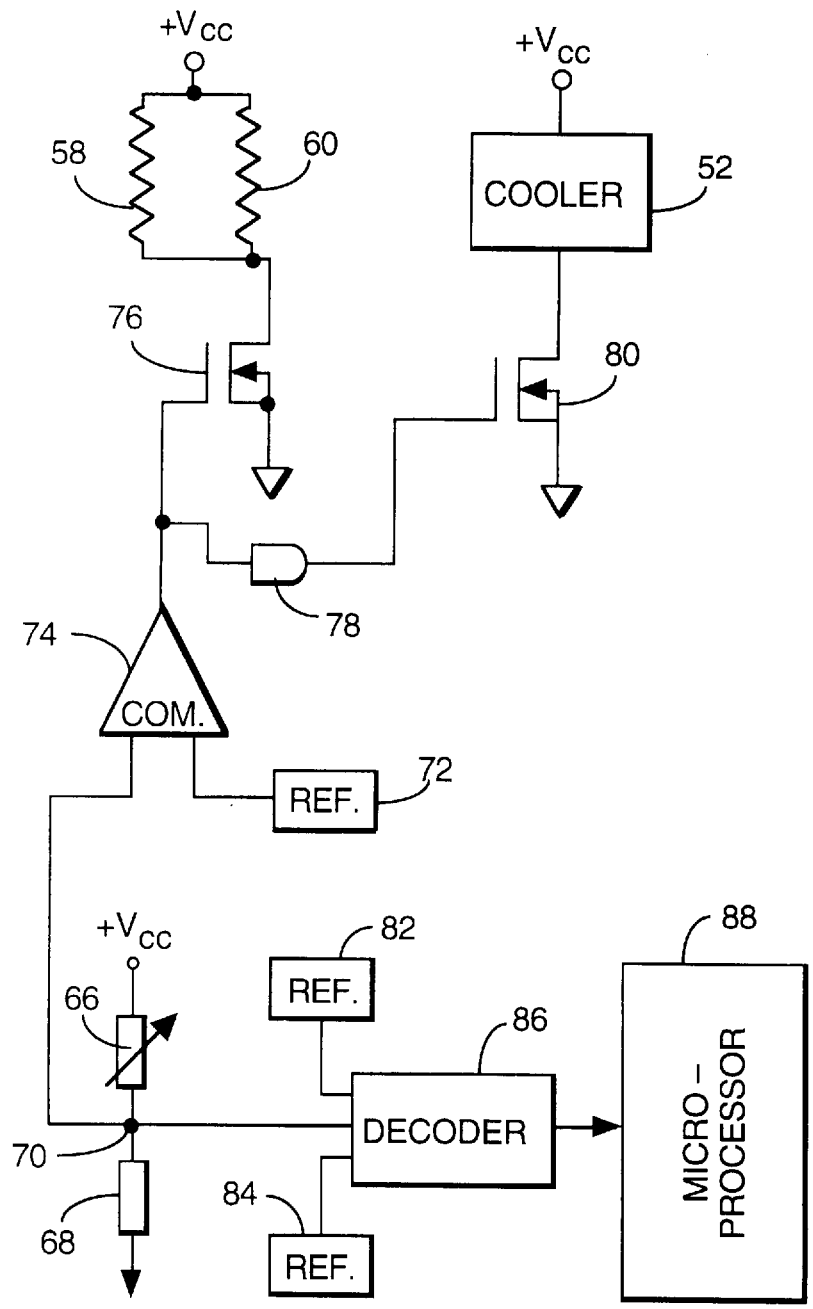
FIG. 6 is a block diagram of the electronic circuitry of FIG. 1.

The electronic circuitry of the assembly of FIG. 5 is depicted in FIG. 6. As seen, thermoresistor 66, connected to a resistor 68, applies at point 70 a voltage which depends on the laser's temperature. A reference voltage at 72 defines the desired (optimal) level of the laser's temperature. If the measured temperature is lower than the desired level, the output of comparator 74 is transferred from the low state to the high state and activates the logic level of the MOSFET transistor 76, which initiates heating. Invertor 78 inverts the comparator's signal and switches off the transistor 80 connected to the thermoelectric cooler 52. If the temperature of the laser is higher than the desired preset level, transistor 80 is switched on and activates cooler 52. If oscillation of the measured temperature is within two levels defined by references 82 and 84, a window detector 86 forms a high level output signal, which is applied to a microprocessor 88.

Figure 7A:
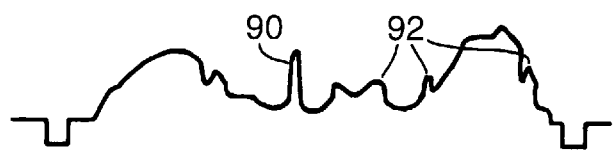
FIG. 7a illustrates a typical video signal of a first field of a frame imaged by the detector of the optical system.

If, for example, the speed of an earth-moving machine is low and the background surface is scattered with small stones or other objects, rapid variation of the reflected light intensity is caused and the laser light will not be satisfactorily separable from the background illumination. A typical video signal in such a case is shown in FIG. 7a, wherein it can be seen that the laser-originated peak 90 is comparable with the other peaks 92 caused by the background.

Figure 7B:
Figure 7C:
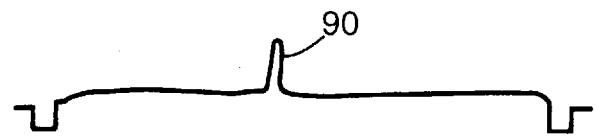
FIG. 7c illustrates a curve resulting from digital subtraction of the two fields of the frame in FIGS. 7a and 7b.

To solve the problem, the laser can be operated in a pulse mode; i.e., it is synchronized with the CCD clock and becomes active only for the first field of each video frame, while being switched off for the second field of the frame. FIG. 7a demonstrates a video signal of the first field (laser power on) and FIG. 7b shows the video signal of the second field (laser power off). Both signals are memorized in the memory of the microprocessor 88 and then digitally substracted from each other. The resulting signal is shown in FIG. 7c.

Figure 8:
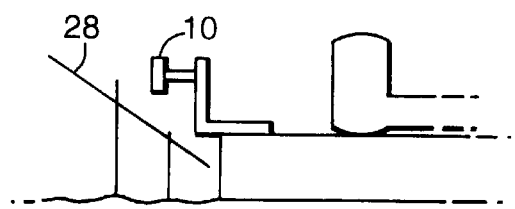
FIG. 8 is a schematic illustration of the tracer system as positioned above a string line.
Figure 9:
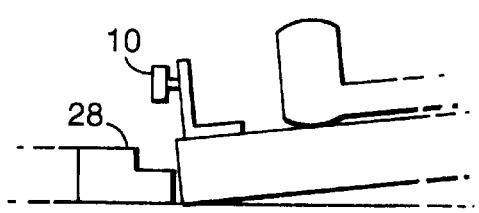
FIG. 9 is a schematic illustration of the tracer system as positioned above a curb.
Figure 10:
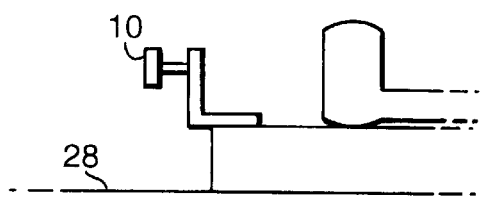
FIG. 10 is a schematic illustration of the tracer system as positioned above a passageway.

As explained above, the optical tracer system can operate, e.g., with three types of reference bodies: a string line or cable as illustrated in FIG. 8, an edge of a curb as illustrated in FIG. 9, or a ground or passageway as shown in FIG. 10.

Figure 11:
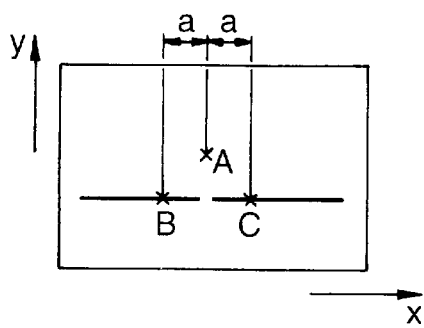
FIG. 11 schematically illustrates an image of an intersection of a laser beam and a string line.
Figure 12:
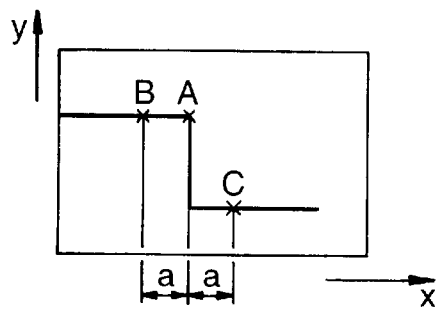
FIG. 12 schematically illustrates an image of an intersection of a laser beam and a curb, and FIG. 13 schematically illustrates an image of an intersection of a laser beam and a passageway.
Figure 13:
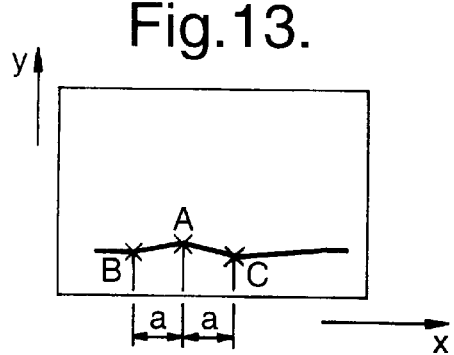

At normal operation, the type of reference body used has first to be identified. This is done by an image processing procedure automatically carried out by the microprocessor of the device. FIGS. 11, 12 and 13 schematically demonstrate typical images received by the detector 22 and processed. As described previously, all pixels resulting from the laser light are above the threshold level, so that the laser-originated signal parts of the image are separated from the background illumination. The next step of the procedure requires searching for the point providing the maximal Y coordinate. If A is such a point and $X_A$ is its horizontal coordinate, then two other points B and C, separated from A along the X axis by a segment a, are found, and their Y-coordinates are analyzed. If both differences $(Y_A-Y_B)$ and $(Y_A-Y_C)$ are more than $\Delta$ (minimal detectable height of the body above the earth), then the reference body is a string line, a cable or a rod (FIG. 11). If $(Y_A-Y_B)<\Delta$ and $(Y_A-Y_C)>\Delta$, then a left curb is identified (FIG. 12). If $(Y_A-Y_B)>\Delta$ and $(Y_A-Y_C)<\Delta$, then a right curb is identified. Finally, if both values $(Y_A-Y_B)$ and $(Y_A-Y_C)$ are less than $\Delta$, a ground or passageway is identified (FIG. 13).

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical tracing system for measuring elevation of a reference body above a reference surface, comprising:
   a laser transmitter radiating a light beam in a downward direction toward said reference body and reference surface;
   means for stabilizing the wavelength of the light beam radiated from said laser transmitter;
   optical means for converting said radiated light beam into a beam of predetermined shape;
   an optical unit for imaging light beam radiation reflected from said reference body and said reference surface on a CCD detector;
   said optical unit including optical means disposed in the path of reflected light beam radiation being imaged on said CCD detector for separating reflected light originating from said laser transmitter from background illumination;
   electronic means for operating said laser transmitter in a pulse mode of a predetermined sequence in synchronization with the operation of said CCD detector, and
   signal processing means for identifying said reference body and for measuring the elevation thereof from said reference surface.

2. The optical tracing system according to claim 1, wherein said laser transmitter includes a laser diode and said first mentioned optical means comprises cylindrical lenses for shaping said light beam into a thin diverging sheet of light.

3. The optical tracing system according to claim 1, wherein said means for stabilizing the wavelength of the light beam radiated from said laser transmitter includes a thermoelectric cooler, electric heating means and insulating means for thermally stabilizing the temperature of the laser transmitter.

4. The optical tracing system according to claim 1, wherein said reference body is selected from the group of bodies including a string, a cable, a rod, an edge of a curb, a surface and a passageway.

5. The optical tracing system according to claim 4, wherein said signal processing means for identifying said body includes means for identifying a body of said group of bodies.

6. The optical tracing system according to claim 1, wherein said second mentioned optical means comprises an optical interference filter having a narrow bandwidth and a maximum transmittance at the working wavelength of said laser transmitter.

7. The optical tracing system according to claim 1, wherein said electronic means for operating said laser transmitter in a pulse mode comprises electronic circuitry for synchronizing the laser transmitter with a clock of said CCD detector, activating the laser transmitter only for a first field of each video frame detected by said CCD detector while switching it off for a second field of said frame, and for memorizing signals representative of first and second field images and subtracting one of said field image signals from the other.

* * * * *